Patented June 7, 1932

1,862,177

UNITED STATES PATENT OFFICE

JOAQUIN JULIO DE LA ROZA, SR., OF TUINUCU, CUBA

METHOD OF MANUFACTURING CELLULOSE

No Drawing.    Application filed May 26, 1928.   Serial No. 280,966.

This invention relates to a method of manufacturing cellulose for all uses to which such material may be put, and has for an object to provide for the production of soft, strong, fibrous material, adapted for use in various manufactures, the said material being produced from sugar cane fiber.

Another object consists in providing such a method whereby the fiber may be given a first treatment, then stored, and then given subsequent treatment leading to the desired product, without any deterioration of or spontaneous injury to the fiber during storage.

Another object consists in providing such a method whereby the fiber may be given a treatment of an acid nature, a washing, and a treatment of an alkaline nature and, by variation of the alkaline treatment, the character of the product may be altered.

Another object consists in providing certain improvements in the method whereby advantageous results are obtained.

This method is of substantial importance in connection with manufacture when conditions require the material to be stored after it has been cut from the growing state and before it can be fully processed in manufacture. In this last connection, my method provides a first treatment which so conditions the fiber that it may be stored for a period of from a day to several months, or more, without deterioration, for instance, by fungus growth; and without danger of injury as, for instance, by spontaneous combustion.

It is my belief that I have devised a method of producing a very pure cellulose which is high in alpha content as well as in other distinctive characteristics of the best grade of this product; which method is commercially economical and practicable and does not impair the native strength of the fibrous element of the sugar cane, but obviates difficulties and disadvantages which have been prevalent in connection with many prior methods. The cellulose product of this method is well adapted for the manufacture of paper, paper board, explosives, artificial silk, photographic films, pyroxylin products, cotton substitutes, absorbents and analogous products.

It is well known that the manufacture of sugar from cane is commonly accompanied by a treatment for the separation of the sugar juices from the fibrous part of the cane as, for instance, by crushing between rollers or treatment in diffusers, and that this industry thus supplies a very large amount of the fibrous material which is commonly very inefficiently employed, if used at all. My method is adapted to the treatment of this material for obtaining the high grade product above set forth.

The method which forms the subject matter of this invention comprehends subjecting the sugar cane fiber first to a treatment with a dilute aqueous sulphurous acid solution; secondly to a washing with water, preferably hot; and thirdly to a treatment with a hot dilute aqueous alkaline solution.

The first, or sulphurous acid treatment, removes, or transforms so as to nullify their injurious effects, the sucrose, invert and other sugars, pentosans, and similar carbohydrates, coloring matters and the like; as well as various fungi and other growths that prey upon the incrusting materials of the vegetable substances. This renders the material suitable for application of the subsequent treatments in the method, and also renders it suitable for storage without danger of deterioration or spontaneous injury. The second, or washing treatment, removes such materials as are in condition for solution or separation by the water at that stage of the method. The third, or alkaline treatment, renders soluble the various substances contained in the fibrous material which remain after the sulphurous acid treatment and washing, whereby they are easily removable by the usual subsequent steps of washing, bleaching, etc., commonly practiced in the treatment of pulp in the paper industry. In following a preferred manner of carrying out my invention, the sugar cane fiber as obtained from the crushing rollers or diffusers, which is in excellent condition for this treatment owing to its wet condition, is conveyed by means of blowers or other suitable contrivance, to apparatus, such as combing and screening devices, for the purpose of separating the dust-like or short and fibrous material, commonly known as pith, from the longer and stronger fibrous material forming the exterior portions of the cane. The long and strong fibers are then washed, preferably with hot water, for the purpose of removing sugars and other water soluble materials that remain after the original crushing or diffusing. The water used for washing may then be separated from the fiber as, for instance, by pressure.

The next procedure is the dilute aqueous sulphurous acid treatment which may be carried out by adding to the fibrous material a solution of sulphurous acid contained in a vat or mixer or the like, at atmospheric pressure. The strength and temperature of solution employed may vary in accordance with conditions, and the action will be substantially in proportion to the amount of sulphurous acid as compared with the bone dry weight of the fiber. Usually, a treatment in a dilute aqueous solution containing four to five percent $SO_2$, based on the bone dry weight of the sugar cane fiber, and conducted for a period of time sufficient to impregnate the fibers, say a few minutes, is adequate in connection with the manufacture of a very high quality of pure cellulose. If desired, the fiber may be successively treated with acid solutions of progressively increasing concentration until it has absorbed the intended percentage of $SO_2$ based upon the bone dry weight of the fiber.

It may be stated that I prefer to employ sulphurous acid of such concentration that it may be handled commercially throughout the various steps of manufacture of acid from sulphur or other sulphur containing material, and treatment of the vegetable matter, with a minimum of discomfort to the operatives and chemical effect on the equipment, but which is sufficiently strong to effect the desired results within a reasonable time. The concentration above named answers these requirements.

After the material has thus been impregnated (sugar cane fiber absorbs without dripping many times its weights of liquids) the material is not only prepared for the subsequent steps of the process, but it is also in condition for storing either in the open, or baled, or in any other approvied manner, because the action of the sulphurous acid prevents the growth of fungi that would tend to consume not only the pectinous and other incrusting substances but would also attack the cellulose itself. Likewise, the action of the sulphurous acid tends to prevent fires arising from spontaneous combustion or accident, as well as to prevent destruction by slow or rapid oxidation, because of the reducing atmosphere generated by the sulphur dioxide. Accordingly, the material may, following the sulphurous acid treatment, either be passed to the next step of the process or be placed in storage and subsequently subjected to the succeeding steps of the process at such time as manufacturing requirements dictate, whether it be a matter of days or a matter of months following the sulphurous acid treatment.

The next step of the process, which may be carried out immediately after the first step or upon withdrawing the material from storage, is to thoroughly wash the charge, preferably with hot water. This washing is very effectively carried out by placing the charge in a washer of the vacuum type in which the operation is such as to suck or draw the water through the mass of fibers.

After the washing has been completed, the fibrous charge is preferably immersed in a dilute aqueous alkaline solution that may contain fifteen to twenty percent of alkali, such as potassium or sodium hydroxide, based on the bone dry weight of the fiber. There should be sufficient of this solution to cover the charge. Thereupon the mixture of fibrous material and alkaline solution is transferred to another vessel for treatment at elevated temperature and pressure. This vessel is preferably composed of ferric material, such as steel or iron, lined with brick adapted to resist the chemical action of the contents. This character of brick is well known to the chemical industry, although it differs sharply from the brick used in the standard sulphite pulp digesters in that the latter are specially designed to withstand acid action only. Such brick may be instanced by the specially burned standard silica brick known to the trade as Semco TX 9X 2 Trad.

The same effect in lining the vessel may be obtained in other ways as, for example, by plating the same with chromium or cadmium. The arrangement of valves, vents, and the like, may differ to a certain extent from the standard arrangement of the sulphite digesters, but such changes are well within the skill of the calling and merely for the purpose of better adapting the apparatus to the specific conditions in hand. It should be stated, however, that the said fittings should be composed of material which is resistant to the chemical reactions involved, or be so treated as to make them resistant thereto.

After the charge of fiber and alkaline solution has been passed into this vessel the valves, vents, openings, and the like, are closed, steam is injected, and the contents heated quite rapidly to a temperature of from approximately 140° to 170° centigrade, and maintained at said temperature for a period of from one to two hours. The time of treatment will, of course, vary in relation to the strength of the solution and temperature employed, and it may also be varied to comply with the dictates of particular conditions in hand or objects desired.

The alkaline solution above described is suitable for the production of a high grade alpha cellulose but, if a product of less purity, but of great strength and flexibility, is desired, sodium sulphate may be substituted for the sodium or potassium hydroxide.

In either case, this alkaline treatment does not compare in intensity with the treatment commonly employed in the manufacture of pulp from wood; but it is not necessary to employ any such intense treatment because the first, or sulphurous acid treatment, coupled with the subsequent washing, will remove so much of the incrusting materials from the fiber that the alkaline step may be adequately performed with economy of chemical and moderate attendant conditions.

After the charge has been submitted to the alkaline treatment for the desired period of time, it is blown from the vessel into a pit or other container, and thereafter washed in a suitable manner with water, bleached and otherwise finally treated, all as is well understood in this art. It will be found that the amount of bleach required will be unusually low and that the product will have unusual strength and other desired qualities, such as softness and pliability, while the yield will be substantially increased.

It should be stated that, although I have described above the separation of the long fibers, and their treatment, the process, or method, is also applicable to the treatment of the whole of the fiber, without such separation, and, also, that the separation may take place and the short fibers be treated instead of the long.

It will be seen from the foregoing that my method avoids intense acid or alkaline treatment, thereby eliminating the disadvantages of many earlier processes, and consequently promoting economy and improving the quality of the product.

Again, it should be noted that neither the acid treatment nor the alkaline treatment would, individually, be sufficient to obtain the product desired from sugar can fiber; and that the dilute sulphurous acid treatment effects only partial solution or transformation of the incrusting matters and similar substances contained in the cane, while the alkaline treatment, which is much less intense in strength of chemical, time and temperature than the usual alkaline processes employed in the treatment of wood, accomplishes, following the intermediate washing, the complete reaction which is desired in order to render the remaining substances easily removable from the cellulose by the final washing and light bleaching.

I may mention that sugar cane fiber contains substances which are soluble in alkali but are precipitated by acid, as well as substances which are soluble in acid but are precipitated by alkali. If the cane fiber is treated first with alkali and then with acid, the substances precipitated by the acid treatment are more undesirable than those precipitated by the alkali if the order of the said treatments is reversed.

If the cane fiber is treated with alkali and acid simultaneously, as would be the case if an attempt were made to produce cellulose from sugar cane fiber by the sulphite process ordinarily employed in connection with wood, or adaptations of said process involving the use of one or more bases, the fiber will not pulp satisfactorily and the desired product will not be obtained.

Owing to the fact that the sulphurous acid treatment, followed by the thorough washing, preferably with hot water, substantially effects the removal of most of the coloring matters, of most of the ferrous material (by forming soluble ferrous salts), and of the sucrose and other similar compounds and carbohydrates, thereby leading to a pliable and strong cellulose; the material is in excellent condition for the production of commercial cellulose by even a very mild alkaline treatment. Thus, it is possible to employ the alkali solution above described at a temperature less than 100° centigrade and at atmospheric pressure; after which the fibrous material may be washed and treated in a rod mill, or pebble refiner, or ball mill or Jordan, or similar apparatus, which will separate the fibers and produce a cellulose suitable for various purposes although not of high purity. Such material, for instance, might well be adapted for the manufacture of news print, or board.

It is a feature of this invention that there may readily be a substantial recovery of chemicals used, particularly the sodium oxide involved in the alkaline treatment; and this is due largely to the thorough washing after the acid treatment and before the alkaline treatment which renders it easy to reclaim the greater proportion of the alkali, thereby effecting a great, or at least substantial, economy in commercial operation. The impracticability or impossibility of recovering the alkali used has been an extremely serious drawback in prior methods calculated to produce this quality of cellulose.

Though I have mentioned treating sugar cane fiber resulting from cane which has been put through the usual processes for extracting the sugar, it is a feature of this invention that I may utilize fiber obtained from sugar cane which has been damaged with respect to its adaptability for the manufacture of sugar, as, for instance, by fires in the field. Such damaged sugar cane, even though it may be unsuitable for the production of sugar, is well adapted for treatment by my above described method whereby the uninjured fibers can be separated and the intended product obtained. When, in the claims, I use the expression "sugar cane fiber," I intend to include other analogous plants of the genus Gramineæ to the treatment of which this particular process is applicable. Likewise, when I refer to dilute sulphurous acid, I intend to cover other dilute acids having an equivalent action in my method.

It will be understood that various changes may be resorted to in the steps of the process and in the apparatus, without departing from the spirit and scope of my invention; and hence, I do not intend to be limited to the details herein set forth except as they may be included in the claims.

What I claim is:

1. A method of treating sugar cane fiber to produce cellulose, which includes, treating the fiber with a dilute sulphurous acid solution, storing the fiber, withdrawing the fiber from storage, washing the fiber, and treating the fiber with an alkaline solution.

2. A method of treating sugar cane fiber to produce cellulose, which includes, treating the fiber with a dilute sulphurous acid solution, storing the fiber, withdrawing the fiber from storage, and treating the fiber with an alkaline solution.

In testimony that I claim the foregoing as my invention, I have signed my name this 25th day of May, 1928.

JOAQUIN JULIO DE LA ROZA, Sr.